United States Patent
Castleman

(10) Patent No.: US 10,805,592 B2
(45) Date of Patent: Oct. 13, 2020

(54) APPARATUS AND METHOD FOR GAZE TRACKING

(71) Applicant: Sony Interactive Entertainment Inc., Tokyo (JP)

(72) Inventor: Dennis D. Castleman, Fremont, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 151 days.

(21) Appl. No.: 15/280,962

(22) Filed: Sep. 29, 2016

(65) Prior Publication Data

US 2018/0004285 A1 Jan. 4, 2018

Related U.S. Application Data

(60) Provisional application No. 62/357,259, filed on Jun. 30, 2016, provisional application No. 62/374,687, filed on Aug. 12, 2016.

(51) Int. Cl.
*G06F 3/01* (2006.01)
*H04N 13/156* (2018.01)
(Continued)

(52) U.S. Cl.
CPC ........... *H04N 13/156* (2018.05); *G06F 3/011* (2013.01); *G06F 3/012* (2013.01); *G06F 3/013* (2013.01); *G06F 3/0482* (2013.01); *G11B 20/10527* (2013.01); *G11B 27/036* (2013.01); *G11B 27/102* (2013.01); *H04L 65/4069* (2013.01);
(Continued)

(58) Field of Classification Search
CPC ............................... G06F 3/013; G06F 3/0482
See application file for complete search history.

(56) References Cited

U.S. PATENT DOCUMENTS 4,208,811 A 6/1980 Junowicz
6,331,869 B1 12/2001 Furlan
(Continued)

FOREIGN PATENT DOCUMENTS

EP 1064817 10/2005
EP 2434772 A1 3/2012
(Continued)

OTHER PUBLICATIONS

Cig, Cagla & Sezgin, Tevfik Metin; "Gaze-Based Virtual Task Predictor", Gazeln'14, ACM, Nov. 16, 2014, 6 pages.
(Continued)

*Primary Examiner* — Dino Kujundzic
(74) *Attorney, Agent, or Firm* — Fitch, Even, Tabin & Flannery LLP

(57) ABSTRACT

A method for gaze tracking is provided. One embodiment of the method for gaze tracking, comprising: presenting a content to a viewer via a playback device, tracking a gaze path of the viewer with a gaze tracker coupled to the playback device, selecting a viewer profile from a plurality of viewer profiles stored in a viewer profile database based on the gaze path of the viewer, and predicting a future gaze location of the viewer based on the viewer profile. Systems perform similar steps and non-transitory computer readable storage mediums each store one or more computer programs are also provided.

27 Claims, 4 Drawing Sheets

(51) Int. Cl.

| | | |
|---|---|---|
| *H04N 13/243* | (2018.01) | |
| *H04N 13/378* | (2018.01) | |
| *H04N 13/383* | (2018.01) | |
| *H04N 5/247* | (2006.01) | |
| *H04N 21/81* | (2011.01) | |
| *H04L 29/06* | (2006.01) | |
| *H04N 21/4223* | (2011.01) | |
| *H04N 21/442* | (2011.01) | |
| *H04N 21/441* | (2011.01) | |
| *H04N 21/845* | (2011.01) | |
| *H04N 21/2343* | (2011.01) | |
| *H04N 21/2387* | (2011.01) | |
| *H04N 21/4728* | (2011.01) | |
| *H04N 21/482* | (2011.01) | |
| *H04N 21/45* | (2011.01) | |
| *H04N 21/6587* | (2011.01) | |
| *H04N 21/435* | (2011.01) | |
| *H04N 21/462* | (2011.01) | |
| *G06F 3/0482* | (2013.01) | |
| *G11B 20/10* | (2006.01) | |
| *G11B 27/036* | (2006.01) | |
| *G11B 27/10* | (2006.01) | |
| *H04N 5/232* | (2006.01) | |
| *H04N 5/265* | (2006.01) | |

(52) U.S. Cl.
CPC ...... *H04L 65/4076* (2013.01); *H04L 65/4084* (2013.01); *H04L 65/602* (2013.01); *H04L 65/604* (2013.01); *H04L 65/80* (2013.01); *H04N 5/247* (2013.01); *H04N 13/243* (2018.05); *H04N 13/378* (2018.05); *H04N 13/383* (2018.05); *H04N 21/2343* (2013.01); *H04N 21/2387* (2013.01); *H04N 21/4223* (2013.01); *H04N 21/4355* (2013.01); *H04N 21/441* (2013.01); *H04N 21/44218* (2013.01); *H04N 21/4532* (2013.01); *H04N 21/4621* (2013.01); *H04N 21/4728* (2013.01); *H04N 21/482* (2013.01); *H04N 21/6587* (2013.01); *H04N 21/816* (2013.01); *H04N 21/845* (2013.01); *G11B 2020/1062* (2013.01); *H04N 5/23238* (2013.01); *H04N 5/265* (2013.01)

(56) References Cited

U.S. PATENT DOCUMENTS

| | | | |
|---|---|---|---|
| 6,337,683 | B1 | 1/2002 | Gilbert |
| 6,362,842 | B1* | 3/2002 | Tahara ................ G06F 3/04812 715/705 |
| 6,559,846 | B1 | 5/2003 | Uyttendaele |
| 6,762,789 | B1 | 7/2004 | Sogabe |
| 6,788,333 | B1 | 9/2004 | Uyttendaele |
| 7,778,485 | B2 | 8/2010 | Zeineh |
| 8,184,069 | B1 | 5/2012 | Rhodes |
| 8,487,959 | B1* | 7/2013 | Khan ...................... G06F 3/013 345/619 |
| 8,636,361 | B2* | 1/2014 | Chen ................. G06K 9/00604 351/203 |
| 8,914,305 | B2* | 12/2014 | Buck ..................... G06Q 40/04 705/37 |
| 8,990,682 | B1 | 3/2015 | Wong |
| 9,462,230 | B1 | 10/2016 | Agrawal |
| 9,665,171 | B1* | 5/2017 | Skogo ..................... G06F 3/013 |
| 9,876,780 | B2 | 1/2018 | Kuper |
| 10,204,658 | B2 | 2/2019 | Krishnan |
| 2002/0021353 | A1 | 2/2002 | Denies |
| 2003/0011619 | A1 | 1/2003 | Jacobs |
| 2004/0239763 | A1 | 12/2004 | Notea |
| 2005/0273185 | A1 | 12/2005 | Teiwes |
| 2006/0045388 | A1 | 3/2006 | Zeineh |
| 2006/0256133 | A1* | 11/2006 | Rosenberg ............. G06F 3/013 345/619 |
| 2007/0153023 | A1 | 7/2007 | Chladny |
| 2007/0188521 | A1 | 8/2007 | Miller |
| 2008/0036875 | A1 | 2/2008 | Jones |
| 2009/0097710 | A1 | 4/2009 | Sroka |
| 2009/0129693 | A1 | 5/2009 | Bloebaum |
| 2009/0273710 | A1 | 11/2009 | Pearlstein |
| 2009/0278921 | A1 | 11/2009 | Wilson |
| 2010/0056274 | A1* | 3/2010 | Uusitalo ............... G02B 27/017 463/31 |
| 2010/0066975 | A1* | 3/2010 | Rehnstrom ........... A61B 3/0008 351/210 |
| 2012/0146891 | A1 | 6/2012 | Kalinli |
| 2012/0170642 | A1 | 7/2012 | Braness |
| 2012/0242781 | A1 | 9/2012 | Gautier |
| 2012/0262540 | A1 | 10/2012 | Rondinelli |
| 2012/0265856 | A1 | 10/2012 | Major |
| 2012/0295708 | A1* | 11/2012 | Hernandez-Abrego ..................... G10L 15/26 463/36 |
| 2012/0306933 | A1 | 12/2012 | Osako |
| 2012/0319928 | A1 | 12/2012 | Rhodes |
| 2013/0128364 | A1 | 5/2013 | Wheeler |
| 2013/0266065 | A1 | 10/2013 | Paczkowski |
| 2013/0271565 | A1 | 10/2013 | Chen |
| 2013/0293672 | A1 | 11/2013 | Suzuki |
| 2014/0085412 | A1 | 3/2014 | Hayashi |
| 2014/0087877 | A1 | 3/2014 | Krishnan |
| 2014/0096077 | A1* | 4/2014 | Jacob ..................... G06F 3/013 715/810 |
| 2014/0123162 | A1* | 5/2014 | Karlsson .............. H04N 21/4331 725/12 |
| 2014/0282750 | A1 | 9/2014 | Civiletto |
| 2015/0002529 | A1 | 1/2015 | Liu |
| 2015/0012403 | A1* | 1/2015 | Buck ..................... G06F 3/013 705/37 |
| 2015/0061995 | A1 | 3/2015 | Gustafsson |
| 2015/0172544 | A1 | 6/2015 | Deng |
| 2015/0172621 | A1 | 6/2015 | Thebault |
| 2015/0193395 | A1* | 7/2015 | Nicolaou ............. G06F 17/3053 707/726 |
| 2015/0234457 | A1* | 8/2015 | Kempinski ............. G06F 3/013 345/156 |
| 2015/0237336 | A1 | 8/2015 | Sylvan |
| 2015/0277710 | A1* | 10/2015 | Lee ..................... G06F 3/0488 715/822 |
| 2016/0012855 | A1 | 1/2016 | Krishnan |
| 2016/0029091 | A1 | 1/2016 | Le Floch |
| 2016/0048964 | A1 | 2/2016 | Kruglick |
| 2016/0286119 | A1 | 9/2016 | Rondinelli |
| 2016/0353090 | A1 | 12/2016 | Esteban |
| 2016/0366355 | A1 | 12/2016 | Iyer |
| 2016/0379415 | A1 | 12/2016 | Espeset |
| 2017/0006220 | A1 | 1/2017 | Adsumilli |
| 2017/0068312 | A1* | 3/2017 | Mallinson ............. G06F 3/013 |
| 2017/0282062 | A1 | 10/2017 | Black |
| 2017/0364760 | A1* | 12/2017 | Canella .................. G06F 3/013 |
| 2017/0366812 | A1 | 12/2017 | Abbas |
| 2018/0007339 | A1 | 1/2018 | Castleman |
| 2018/0007422 | A1 | 1/2018 | Castleman |
| 2018/0075635 | A1 | 3/2018 | Choi |
| 2019/0108859 | A1 | 4/2019 | Krishnan |

FOREIGN PATENT DOCUMENTS

| | | |
|---|---|---|
| EP | 2529811 | 12/2012 |
| IN | 2866CH2015 | 7/2015 |
| JP | 2004056335 | 2/2004 |
| JP | 2006171822 | 6/2006 |
| JP | 2009027457 | 2/2009 |
| JP | 2011123349 | 6/2011 |
| JP | 2012070378 | 4/2012 |
| JP | 2013012181 | 1/2013 |
| JP | 2014072608 | 4/2014 |
| JP | 2015118448 | 6/2015 |

(56) References Cited

FOREIGN PATENT DOCUMENTS

| WO | 0008889 | 2/2000 |
|---|---|---|
| WO | 2012147303 A1 | 11/2012 |
| WO | 2015184416 | 12/2015 |

OTHER PUBLICATIONS

James, Paul; "Hands On: SMI Proves that Foveated Rendering is Here and it Really Works", Road to VR, https://www.roadtovr.com/hands-on-smi-proves-that-foveated-rendering-is-here-and-it-really-works/, Jan. 10, 2016, 6 pages.
Patent Cooperation Treaty; "International Search Report" issued in PCT/US17/35057, dated Aug. 23, 2017; 2 pages.
Patent Cooperation Treaty; "Notification of Transmittal of the International Search Report and the Written Opinion of the International Searching Authority, or the Declaration" issued in PCT/US17/35057, dated Aug. 23, 2017; 2 pages.
Patent Cooperation Treaty; "Written Opinion of the International Searching Authority" issued in PCT/US17/35057, dated Aug. 23, 2017; 14 pages.
Patent Cooperation Treaty; "International Search Report" issued in PCT Application No. PCT/US17/35058, dated Sep. 25, 2017, 4 pages.
Patent Cooperation Treaty; "International Search Report" issued in PCT Application No. PCT/US17/35060, dated Aug. 4, 2017, 2 pages.
Patent Cooperation Treaty; "Invitation to Pay Additional Fees and, Where Applicable, Protest Fee" issued in PCT Application No. PCT/US17/35058, mailed Aug. 3, 2017, 2 pages.
Patent Cooperation Treaty; "Notification of Transmittal of the International Search Report and the Written Opinion of the International Searching Authority, or the Declaration" issued in PCT Application No. PCT/US17/35058, dated Sep. 25, 2017, 2 pages.
Patent Cooperation Treaty; "Notification of Transmittal of the International Search Report and the Written Opinion of the International Searching Authority, or the Declaration" issued in PCT Application No. PCT/US17/35060, dated Aug. 4, 2017, 2 pages.
Patent Cooperation Treaty; "Written Opinion of the International Searching Authority" issued in PCT Application No. PCT/US17/35058, dated Sep. 25, 2017, 10 pages.
Patent Cooperation Treaty; "Written Opinion of the International Searching Authority" issued in PCT Application No. PCT/US17/35060, dated Aug. 4, 2017, 10 pages.
Wikipedia; "Immersive video", https://en.wikipedia.org/wiki/Immersive-video, printed on Jun. 23, 2016, 2 pages.
Wikipedia; "Omnidirectional camera", https://en.wikipedia.org/wiki/Omnidirectional_camera, printed on Jun. 23, 2016, 4 pages.
Ngo Quang Minh Khiem et al.; "Adaptive Encoding of Zoomable Video Streams based on User Access Pattern;" Feb. 23, 2011, http://www.cs.princeton.edu/-qngo/docs/mmsys2011-adaptive-encoding.pdf (Year: 2011); pp. 211-222.
USPTO; Office Action issued in U.S. Appl. No. 15/280,947, dated May 16, 2018, 25 pages.
USPTO; Office Action issued in U.S. Appl. No. 15/280,933, dated Jun. 8, 2018, 13 pages.
Patent Cooperation Treaty; "International Search Report" issued in corresponding PCT Application No. PCT/US15/36224, dated Sep. 21, 2015; 2 pages.
Patent Cooperation Treaty; "Notification of Transmittal of the International Search Report and the Written Opinion of the International Searching Authority, or the Declaration" issued in corresponding PCT Application No. PCT/US15/36224, dated Sep. 21, 2015; 2 pages.
Patent Cooperation Treaty; "Written Opinion of the International Searching Authority" issued in corresponding PCT Application No. PCT/US15/36224, dated Sep. 21, 2015; 8 pages.
renderstuff.com; "Creating Virtual 360 Panorama"; Tutorial from http://renderstuff.com/creating-virtual-360-panorama-cg-tutorial/; Printed Jun. 5, 2014; 8 Pages.

USPTO; Applicant-Initiated Interview Summary in U.S. Appl. No. 14/340,152, dated Feb. 21, 2018, 3 pages.
USPTO; Final Office Action issued in U.S. Appl. No. 14/340,152, dated Aug. 23, 2016, 58 pages.
USPTO; Final Office Action issued in U.S. Appl. No. 14/340,152, dated Nov. 2, 2017, 62 pages.
USPTO; Non-Final Office Action issued in U.S. Appl. No. 14/340,152, dated Feb. 11, 2016, 33 pages.
USPTO; Non-Final Office Action issued in U.S. Appl. No. 14/340,152, dated Jun. 6, 2017, 57 pages.
USPTO; Notice of Allowance and Fee(s) Due and After Final Consideration Pilot (AFCP 2.0) Decision issued in U.S. Appl. No. 14/340,152, dated Apr. 5, 2018, 10 pages.
Japanese Patent Office; "Notification of Reason(s) for Refusal" issued in Japanese Patent Application No. 2017-502168, dated Apr. 3, 2018, 20 pages (Includes English Translation).
European Patent Office; "Extended European Search Report" issued in European Patent Application No. 15822840.3, dated Feb. 26, 2018, 8 pages.
USPTO; Notice of Allowance and Fee(s) Due issued in U.S. Appl. No. 14/340,152, dated Aug. 6, 2018, 9 pages.
Japanese Patent Office; "Decision to Grant a Patent" issued in Japanese Patent Application No. 2017-502168, dated Sep. 4, 2018, 3 pages.
USPTO; Final Office Action issued in U.S. Appl. No. 15/280,933, dated Nov. 13, 2018, 15 pages.
Chinese Patent Office; "The First Office Action" issued in Chinese Patent Application No. 201580038371.1, dated Nov. 12, 2018, 20 pages.
USPTO; Corrected Notice of Allowability issued in U.S. Appl. No. 14/340,152, dated Jan. 8, 2019, 6 pages.
Chinese Patent Office; "Notification of the Decision to Grant a Patent" issued in Chinese Patent Application No. 201580038371.1, dated Jun. 20, 2019, 5 pages.
USPTO; Non-Final Office Action issued in U.S. Appl. No. 15/280,933, dated Jul. 18, 2019, 17 pages.
USPTO; Non-Final Office Action issued in U.S. Appl. No. 15/280,947, dated Aug. 13, 2019, 26 pages.
U.S. Patent App. No. 15/280,933, filed Sep. 29, 2016, published as U.S. Pub. No. 2018/0007339 A1 dated Jan. 4, 2018, entitled "Apparatus and Method for Capturing and Displaying Segmented Content".
U.S. Appl. No. 14/340,152, filed Jul. 4, 2014, published as U.S. Pub. No. 2016/0012855 Al 011 dated Jan. 14, 2016, now U.S. Pat. No. 10,204,658, entitled "System and Method for Use in Playing Back Panorama Video Content".
U.S. Appl. No. 16/215,295, filed Dec. 10, 2018, published as U.S. Pub. No. 2019/0108859 Al dated Apr. 11, 2019, entitled "System and Method for Use in Playing Back Panorama Video Content".
U.S. Appl. No. 15/280,947, filed Sep. 29, 2016, published as U.S. Pub. No. 2018/0007422 Al dated Jan. 4, 2018, entitled "Apparatus and Method for Providing and Displaying Content".
USPTO; Final Office Action issued in U.S. Appl. No. 15/280,947, dated Jan. 2, 2020, 26 pages.
Japanese Patent Office; "Notification of Reason(s) for Refusal" issued in Japanese Patent Application No. 2018-568224, dated Jan. 7, 2020, 8 pages(includes English translation).
European Patent Office; "Extended European Search Report" issued in European Patent Application No. 17820807.0, dated Jan. 24, 2020, 10 pages.
European Patent Office; "Extended European Search Report" issued in European Patent Application No. 17820805.4, dated Jan. 24, 2020, 9 pages.
USPTO; Non-Final Office Action issued in U.S. Appl. No. 16/215,295, dated Jan. 23, 2020, 39 pages.
USPTO; Final Office Action issued in U.S. Appl. No. 15/280,933, dated Jan. 28, 2020, 16 pages.
European Patent Office; Communication Pursuant to Rules 70(2) and 70a(2) EPC issued in European Patent Application No. 17820807.0, dated Feb. 11, 2020, 1 page.
European Patent Office; Communication Pursuant to Rules 70(2) and 70a(2) EPC issued in European Patent Application No. 17820805.4, dated Feb. 11, 2020, 1 page.

(56) References Cited

OTHER PUBLICATIONS

Japanese Patent Office; "Decision to Grant a Patent" issued in Japanese Patent Application No. 2018-568225, dated Mar. 3, 2020, 3 pages.
Korean Intellectual Property Office; "Office Action" issued in Korean Patent Application No. 10-2019-7003058, dated Mar. 10, 2020, 9 pages (includes English Translation).
USPTO; Non-Final Office Action issued in U.S. Appl. No. 15/280,947, dated May 8, 2020, 31 pages.
USPTO; Notice of Allowance and Fee(s) Due issued in U.S. Appl. No. 16/215,295, dated May 11, 2020, 5 pages.
USPTO; Final Office Action issued in U.S. Appl. No. 15/280,933, dated Aug. 25, 2020, 17 pages.
USPTO; Notice of Allowance and Fee(s) Due issued in U.S. Appl. No. 16/215,295, dated Aug. 31, 2020, 5 pages.

* cited by examiner

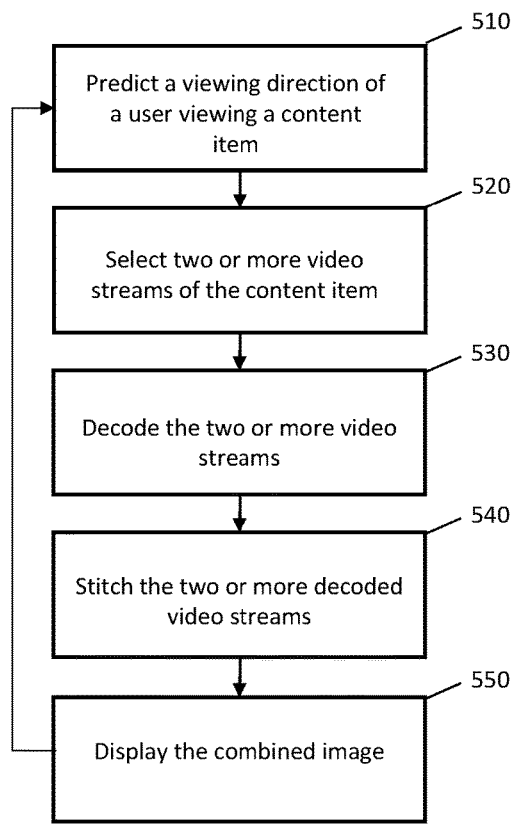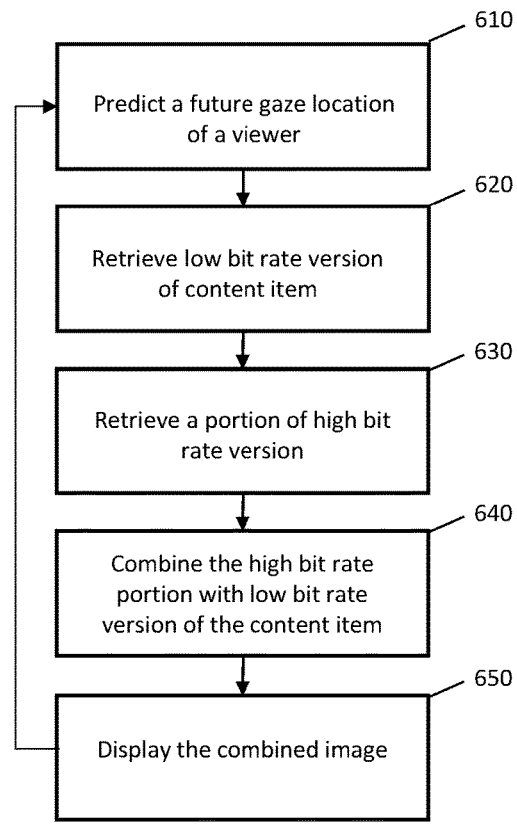
*FIG. 5*
*FIG. 6*

APPARATUS AND METHOD FOR GAZE TRACKING

CROSS-REFERENCE TO RELATED APPLICATIONS

This application claims the benefit of U.S. Provisional Patent Application No. 62/357,259, filed on Jun. 30, 2016, entitled "APPARATUS AND METHOD FOR CAPTURING AND DISPLAYING SEGMENTED CONTENT", the entire disclosure of which is hereby fully incorporated by reference herein in its entirety.

This application also claims the benefit of U.S. Provisional Patent Application No. 62/374,687, filed on Aug. 12, 2016, entitled "APPARATUS AND METHOD FOR PROVIDING AND DISPLAYING CONTENT", the entire disclosure of which is hereby fully incorporated by reference herein in its entirety.

This application is related to U.S. patent application Ser. No. 15/280,933, filed on the same date as this application, entitled "APPARATUS AND METHOD FOR CAPTURING AND DISPLAYING SEGMENTED CONTENT", by inventor Dennis D. Castleman, the entire disclosure of which is hereby fully incorporated by reference herein in its entirety.

This application is also related to U.S. patent application Ser. No. 15/280,947, filed on the same date as this application, entitled "APPARATUS AND METHOD FOR PROVIDING AND DISPLAYING CONTENT", by inventor Dennis D. Castleman, the entire disclosure of which is hereby fully incorporated by reference herein in its entirety.

BACKGROUND OF THE INVENTION

1. Field of the Invention

The present invention relates generally to motion tracking.

2. Discussion of the Related Art

Gaze tracking is the process of tracking a viewer's gaze location using sensors. The gaze location may then be used as an input to a computer system.

SUMMARY OF THE INVENTION

One embodiment provides a method for gaze tracking comprising: presenting a content to a viewer via a playback device, tracking a gaze path of the viewer with a gaze tracker coupled to the playback device, selecting a viewer profile from a plurality of viewer profiles stored in a viewer profile database based on the gaze path of the viewer, and predicting a future gaze location of the viewer based on the viewer profile.

Another embodiment provides a system for gaze tracking, comprising: a viewer profile database, a communication device, and a processor coupled to the viewer profile database and the communication device. The processor being configured to: present a content to a viewer via a playback device coupled to the communication device, track a gaze path of the viewer with a gaze tracker coupled to the playback device, select a viewer profile from a plurality of viewer profiles stored in the viewer profile database based on the gaze path of the viewer, and predict a future gaze location of the viewer based on the viewer profile.

Another embodiment provides a non-transitory computer readable storage medium storing one or more computer programs configured to cause a processor based system to execute steps comprising: presenting a content to a viewer via a playback device, tracking a gaze path of the viewer with a gaze tracker coupled to the playback device, selecting a viewer profile from a plurality of viewer profiles stored in a viewer profile database based on the gaze path of the viewer, and predicting a future gaze location of the viewer based on the viewer profile.

Another embodiment provides a system for gaze tracking, comprising: a display device, a gaze tracker, a communication device, and a processor coupled to the display device, the gaze tracker, and the communication device. The processor being configured to: present a content to a viewer via a display device, track a gaze path of the viewer with the gaze tracker, select a viewer profile from a plurality of viewer profiles stored in a viewer profile database based on the gaze path of the viewer, predict a future gaze location of the viewer based on the viewer profile, and retrieve, with the communication device, a portion of the content from a content server based on the future gaze location.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein:

FIG. 5 is a flow diagram illustrating a method for providing content in accordance with some embodiments of the present invention; and FIG. 6 is a flow diagram illustrating a method for providing content in accordance with some embodiments of the present invention.

DETAILED DESCRIPTION

Gaze tracking may comprise eye tracking and/or head tracking. In some embodiments, gaze tracking may be used to determine a viewer's point of fixation in a displayed image and/or in a scene of the real world. In virtual reality (VR) and augmented reality (AR) application, the system may use the viewer's gaze location to determine the content to display to the user.

Figure 1:
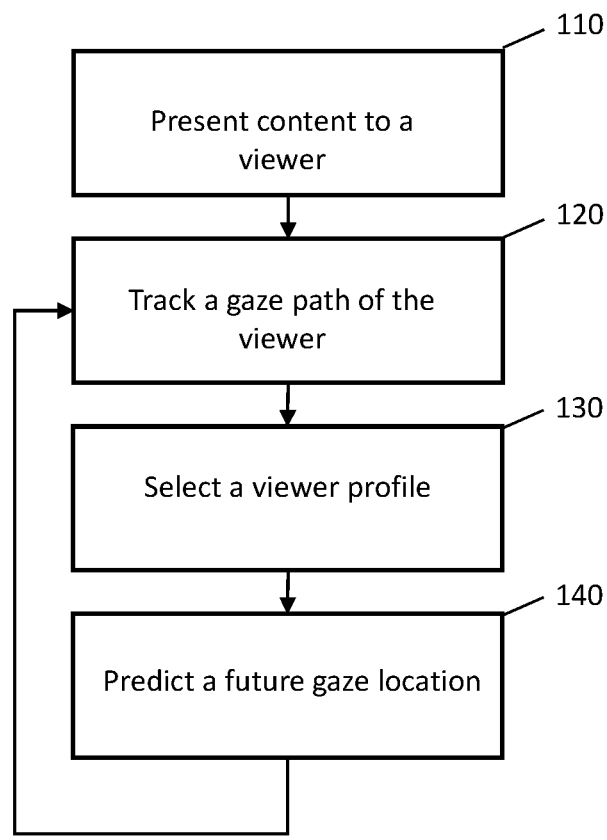
FIG. 1 is a flow diagram illustrating a method for tracking gaze in accordance with some embodiments of the present invention.

Referring first to FIG. 1, a method for tracking gaze is shown. The steps in FIG. 1 may generally be performed by a processor-based device such as one or more of a computer system, a server, a cloud-based server, a content host, a streaming service host, a media server, a playback device, a display device, and the like. In some embodiments, the steps in FIG. 1 may be performed by one or more of the server 210 and the playback device 220 described with reference to FIG. 2, the server described with reference to FIG. 4, and/or other similar devices.

In step 110, the system presents a content to a viewer via a playback device. In some embodiments, the content may comprise one or more of a movie, a TV show, a video clip, prerecorded video content, streaming video content, live-streamed video content, and the like. In some embodiments, the content may comprise a single video stream or a plurality of video streams captured by one or more of a stereoscopic camera system, a panoramic camera system, a surround view camera system, a 360-degree camera system, an omni-directional camera system, and the like. In some embodiments, the content may be streamed from a content server to the playback device. In some embodiments, the playback device may comprise one or more of a game console, a personal computer, a tablet computer, a television, a head mounted display ("HMD"), an augmented reality device, a virtual reality device, a wearable device, a portable user device, a smartphone, etc. In some embodiments, the playback device may comprise a device and/or system of the type described in U.S. patent application Ser. No. 15/085, 887, filed on Mar. 30, 2016, entitled "Head-Mounted Display Tracking," the entire disclosure of which is hereby fully incorporated by reference herein in its entirety.

In step 120, the system tracks a gaze path of the viewer. In some embodiments, the gaze path may be tracked by a gaze tracker coupled to the playback device. In some embodiments, the gaze tracker may be configured track one or more of the viewer's eye movement, head movement, and body movement. In some embodiments, the gaze tracker may comprise one or more of an image sensor, an optical reflector sensor, a range sensor, an electromyography (EMG) sensor, and an optical flow sensor for detecting eye and/or head movement. In some embodiments, the gaze tracker may comprise an Inertial Measurement Unit (IMU) that measures and reports a body's specific force, angular rate, and/or magnetic field surrounding the body, using a combination of accelerometers and gyroscopes, sometimes also magnetometers. In some embodiments, the gaze tracker may be coupled to an HMD and/or a wearable device that allows the sensor to detect the motion of the user's head or eyes via the motion of the HMD and/or wearable device. In some embodiments, the gaze tracker may comprise an optical sensor for detecting one or more of a head motion and eye-motion of the user. In some embodiments, the sensor may be coupled to an HMD and/or a wearable device or comprise a relatively stationary device that captures data from the viewer from a distance. In some embodiments, the gaze path of the viewer may be tracked by any conventional eye tracking, head tracking, and/or motion tracking sensors.

In embodiments, the gaze path of the viewer may comprise a record of a plurality of gaze locations and/or directions of the viewer detected over time. In some embodiments, the gaze path of the viewer may comprise gaze locations and/or directions timestamped according to the timestamp of the content viewed by the viewer. In some embodiments, the gaze locations in a gaze path may each be associated with one or more frames of the content. In some embodiments, the gaze path may comprise a two-dimensional gaze path. In some embodiments, the gaze path may comprise gaze locations comprising a coordinate in the display area of the content. In some embodiments, the gaze path may comprise a three-dimensional gaze paths. For example, the content may comprise immersive content in which viewers may navigation through a three-dimension space with body movement and/or input devices. In some embodiments, the gaze path comprises x, y, and z coordinates corresponding to the head and/or eyes of the viewer and a viewing direction.

In step 130, the system selects a viewer profile based on the gaze path of the viewer tracked in step 120. In some embodiments, the viewer profile may be selected from a plurality of viewer profiles associated with the content stored in a viewer profile database. In some embodiments, each viewer profile may comprise an expected gaze path associated with the content. In some embodiments, a viewer profile may be associated with a segment of the content and/or the entire duration of the content. In some embodiments, the expected gaze path may comprise expected fixation points in one or more frames of the content. In some embodiments, the viewer profile may be selected based on matching the user's gaze path tracked in step 120 with the gaze paths in the plurality of viewer profiles during the same time period in the content. In some embodiments, the tracked gaze path may be compared to the viewer profiles by determining the amount of deviation between the tracked gaze path and the gaze paths in the viewer profiles and selecting the viewer profile with the least amount of deviation.

In some embodiments, the viewer profiles may comprise one or more viewer profiles generated based on gaze paths of a plurality of users who viewed the content. For example, the system may record gaze paths of a plurality of viewers that viewed the same content. The gaze paths may then be grouped by their similarity to each other and a viewer profile may be created for each cluster of similar gaze paths. In some embodiments, the viewer profiles may comprise one or more default viewer profiles created during a post-production process of the content. For example, a producer of the content may manually input a default gaze path based on where he/she believes the viewer's fixation locations will likely be. In some embodiments, prior to a content being release, one or more viewers may view the content during the post production processor to generate a default viewer profile. In some embodiments, the viewer profiles may comprise one or more viewer profiles generated based on tracking a movement of one or more objects in the content. For example, a viewer profile associated with a soccer game may comprise a gaze path that is associated with the movement of the soccer ball during gameplay. In another example, a viewer profile may comprise a gaze path that follows the fastest moving object in the frame. In yet another example, a viewer profile may comprise a gaze path that follows a particular actor or actors in the content. In some embodiments, the content may be processed with an object recognition engine to identify one or more objects in the content. The locations of the identified objects may then be used to generate a gaze path of a viewer profile.

In some embodiments, when a content is initially shown to a viewer, the system may use a default viewer profile to predict the viewer's future gaze location and the viewer profile associated with the viewer may be subsequently adjusted in step 130 when gaze tracking data becomes available. In some embodiments, when the content is initially shown to a viewer, a viewer profile may be selected base on the viewer's demographic information such as age, gender, location, etc. In some embodiments, one or more the default viewer profiles may be generated during the post-production process of the content.

In step 140, the system predicts a future gaze location of the viewer based on the viewer profile selected in step 130. In some embodiments, the predicted future gaze location for a frame of the content may correspond to the gaze location and/or direction of the expected gaze path in the viewer profile selected in step 130. In some embodiments, the expected gaze path in the viewer profile may comprise gaze direction information and the system first identify a portion of the content display area that corresponds to the expected gaze direction to predict the gaze location.

In some embodiments, the future gaze location predicted in step 140 may be used by the system to affect the display of the content. In some embodiments, the system may be configured to select a portion of the content based on the future gaze location and buffer the portion of the content at the playback device. In some embodiments, the portion of the content buffered at the playback device may correspond to a focal area associated with the future gaze location. In some embodiments, a system may be configured to provide a low bitrate version of a content item and a portion of a high bitrate version of the content item corresponding to the focal area to a playback device as described in U.S. Provisional Patent Application No. 62/374,687, filed on Aug. 12, 2016, entitled "APPARATUS AND METHOD FOR PROVIDING AND DISPLAYING CONTENT" the entire disclosure of which is hereby fully incorporated by reference herein in its entirety. The portion of the high bitrate version may be selected and/or buffered at the playback device based on the future gaze location predicted in step 140.

In some embodiments, the portion of the content corresponds to a video stream selected from a plurality of video streams comprising the content. In some embodiments, the content may comprise a plurality of separately encoded video streams and the system may be configured to select one or more streams to provide to the playback device as described in U.S. Provisional Patent Application No. 62/357,259, filed on Jun. 30, 2016, entitled "APPARATUS AND METHOD FOR CAPTURING AND DISPLAYING SEGMENTED CONTENT" the entire disclosure of which is hereby fully incorporated by reference herein in its entirety. The one or more video streams provided to the playback device may be selected based on the future gaze location predicted in step 140.

In some embodiments, the system may further determine an insertion location for added content based on the future gaze location. In some embodiments, the added content may comprise one or more of alert information, supplemental information, selection menu, and advertisement content. For example, the system may be configured to insert native advertisement into legacy content based on the predicted gaze location of the viewer. Examples of methods and systems that displays content based on predicted future gaze location according to some embodiments are described with reference to FIGS. 5 and 6 herein.

In some embodiments, after step 140, the process may return to step 120 during the playback of the content. In some embodiments, the system may track the subsequent gaze path of the viewer after selecting the viewer profile and select a different one of the plurality of viewer profiles based on the subsequent gaze path. In some embodiments, the viewer profile selected for a viewer in step 130 may change any number of time as the viewer views the content. In some embodiments, step 130 may be repeated periodically (e.g. 1 second, 2 seconds, 240 frames, etc.). In some embodiments, step 130 may be repeated when a substantial deviation from the expected gaze path is detected.

Figure 2:
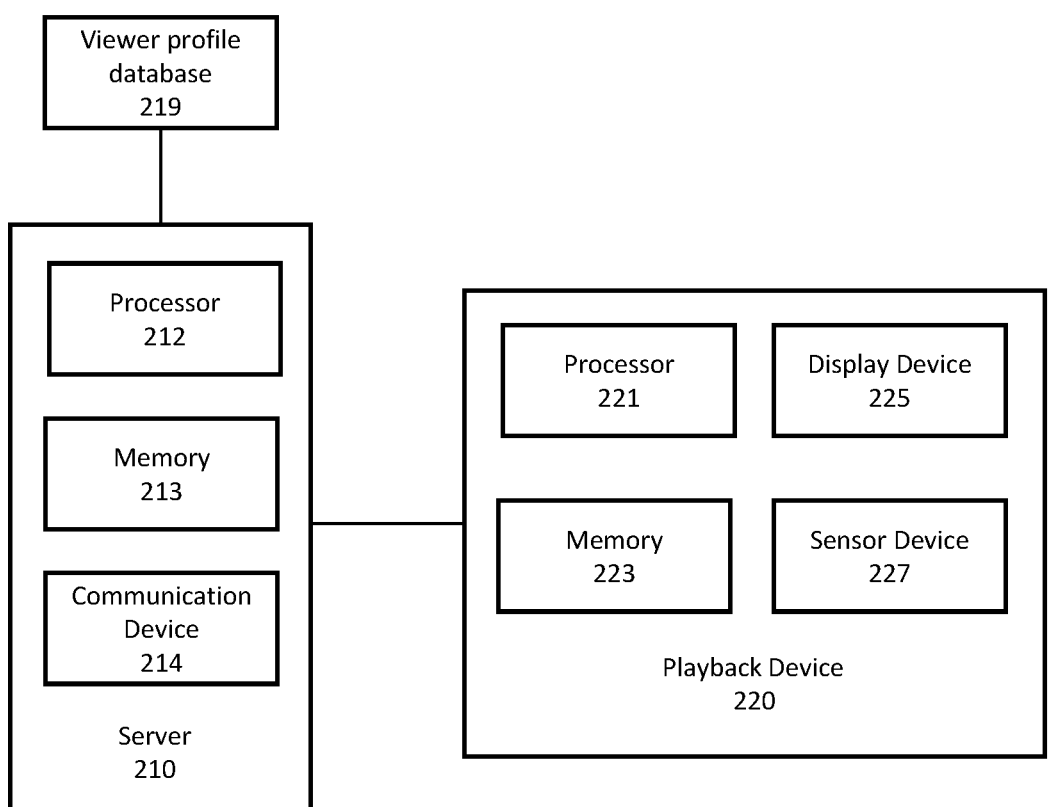
FIG. 2 is a block diagram illustrating a system for tracking gaze in accordance with some embodiments of the present invention.

Referring next to FIG. 2, there is shown a system for gaze tracking that may be used to run, implement, and/or execute any of the methods and techniques shown and described herein in accordance with some embodiments of the present invention. The system includes a server 210 and a playback device 220 communicating over a data connection such as a network.

The server 210 includes a processor 212, a memory 213, and a communication device 214. The server 210 may generally comprise one or more processor-based devices accessible by the playback device via a network such as the Internet. In some embodiments, the content server may comprise one or more of a cloud-based server, a content host, a streaming service host, a media server, a streaming video server, a broadcast content server, a social networking server, and the like. The processor 212 may comprise one or more of a control circuit, a central processor unit, a graphical processor unit (GPU), a microprocessor, a video decoder, a video encoder and the like. The memory 213 may include one or more of a volatile and/or non-volatile computer readable memory devices. In some embodiments, the memory 213 stores computer executable code that causes the processor 212 to provide content to the playback device 220. In some embodiments, the communication device 214 may comprise one or more of a network adapter, a data port, a router, a modem, and the like. Generally, the communication device 214 may be configured to allow the processor 212 to communicate with the playback device 220. In some embodiments, the processor 212 may be configured to match a user's gaze path detected by the playback device 220 with a viewer profile stored in the viewer profile database 219. In some embodiments, the server 210 may further comprise a content server configured to provide content to the playback device 220 based on the selected viewer profile. In some embodiments, the server 210 may be configured to stream the content recorded by a capture device to the playback device 220 in substantially real-time. In some embodiments, the server 210 may be configured to host a plurality of prerecorded content items for streaming and/or downloading to the playback devices 220 on-demand.

The viewer profile database 219 may comprise computer readable memory storage storing a plurality of viewer profiles associated with one or more content items. In some embodiments, the viewer profiles may each be associated with a particular content item and comprise an expected gaze path associated with the content. In some embodiments, the expected gaze path may comprise expected fixation points and/or viewing directions in one or more frames of the content. In some embodiments, each viewer profile may be associated with a segment of the content and/or the entire duration of the content.

In some embodiments, the viewer profiles in the viewer profile database 219 may comprise one or more viewer profiles generated based on gaze paths of a plurality of users who viewed the content. For example, the system may record gaze paths of a plurality of viewers that viewed the same content. The gaze paths may be grouped by their similarity to each other and a viewer profile may be created for each cluster of similar gaze paths. In some embodiments, for broadcasted live-streamed content such as sports events, viewer profiles may be established based on the gaze paths of model viewers who views the content with no or less time delay as compared to the viewers of the broadcasted content. In some embodiments, the viewer profiles in the viewer profile database 219 may comprise one or more default viewer profile created during a post-production process of the content. In some embodiments, prior to a content being released for broadcast, one or more viewers may view the content during the post production processor to generate a default viewer profile. In some embodiments, the viewer profiles in the viewer profile database 219 may comprise one or more viewer profiles generated based on tracking a movement of one or more objects in the content. For example, a viewer profile associated with a soccer game may comprise a gaze path that is associated with the movement of the soccer during gameplay. In another example, a viewer profile in the viewer profile database 219 may comprise a gaze path that follows the fastest moving object in the frame. In yet another example, a viewer profile in the viewer profile database 219 may comprise a gaze path that follows a particular actor or actors in the content. In some embodiments, the content may be processed with an object recognition engine to identify one or more objects in the content. The locations of the identified objects in the frame of the content may then be used to generate a gaze path for a viewer profile. In some embodiments, one or more viewer profiles in the viewer profile database 219 may be associated with viewer demographic information (e.g. gender, age, location, etc.). If a tracked gaze path is not available, a viewer profile may be selected based on viewer demographic information.

While only one playback device 220 is shown in FIG. 2, in some embodiments, the server 210 may be configured to simultaneously select viewer profiles and/or provide content to a plurality of playback devices 220 via the communication device 214. In some embodiments, the server 210 may be configured to facilitate peer-to-peer transfer of video streams between capture devices and playback devices 220. In some embodiments, the server 210 may be configured add to and/or modify viewer profiles in the viewer profile database 219 based on records of viewer gaze paths received from a plurality of playback devices 220. For example, if a group of viewers shares a similar gaze path for a portion of the content that does not match well with an existing viewer profile in the viewer profile database 219, the server 210 may create a new viewer profile based on the group of similar gaze paths. In some embodiments, the system may use the demographic of viewers to update the demographic associated with one or more viewer profiles. While one server 210 is shown, in some embodiments, functionalities of the server 210 may be implemented on one or more processor-based devices.

The playback device 220 comprises a processor 221, a memory 223, a display device 225, and a sensor device 227. In some embodiments, the playback device 220 may generally comprise a processor-based devices such as one or more of a game console, a media console, a set-top box, a personal computer, a tablet computer, a television, a head mounted display ("HMD"), an augmented reality device, a virtual reality device, a wearable device, a portable user device, a smartphone, etc. The processor 221 may comprise one or more of a control circuit, a central processor unit (CPU), a graphical processor unit (GPU), a microprocessor, a video decoder and the like. The memory 223 may include one or more of a volatile and/or non-volatile computer readable memory devices. In some embodiments, the memory 223 stores computer executable code that causes the processor 221 to track a viewer's gaze path with the sensor device 227. In some embodiments, the playback device 220 may be configured predict a further gaze location based on viewer profiles retrieved from the server 210 and/or stored locally. In some embodiments, the playback device 220 may be configured to retrieve content from the server 210 and/or render content locally based on the predicted gaze location of the viewer. In some embodiments, the memory 223 may comprise a buffer for buffering, from the server 210, a portion of the content being view on the display device 225. In some embodiments, the computer executable code stored in the memory 223 may comprise one or more of a computer program, a software program, a playback device firmware, a mobile application, a game and/or media console application, etc.

The display device 225 may comprise a device for displaying content to a viewer. In some embodiments, the display device 225 may comprise one or more of a monitor, a television, a head mounted display (HMD), a virtual reality display device, a wearable device, a display screen, a mobile device, and the like. In some embodiments, the display device 225 may comprise a stereoscopic display having one or more screens.

The sensor device 227 may comprise one or more sensors configured to track the gaze of a viewer of the display device 225. In some embodiments, the sensor device 227 may comprise one or more of an image sensor, an optical reflector sensor, a range sensor, an electromyography (EMG) sensor, and an optical flow sensor for detecting eye and/or head movement. In some embodiments, the sensor device 227 may comprise an IMU that measures and reports a body's specific force, angular rate, and/or magnetic field surrounding the body, using a combination of accelerometers and gyroscopes, sometimes also magnetometers. In some embodiments, the sensor device 227 may be coupled to an HMD and/or a wearable device that allows the sensor to detect the motion of the user's head or eyes via the motion of the HMD and/or wearable device. In some embodiments, the sensor device 227 may comprise a camera for detecting one or more of a head motion and eye-motion of the user. In some embodiments, the sensor device 227 may be coupled to an HMD and/or a wearable device or be a relatively stationary device that captures data from the viewer from a distance.

While the display device 225 is shown as part of the playback device 220, in some embodiments, the display device 225 may comprise a separate device with or without a separate processor. In some embodiments, the display device 225 may be coupled to the playback device 220 via a wired or wireless communication channel. For example, the playback device 220 may comprise a PC or a game console and the display device 225 may comprise an HMD configured to display content from the playback device 220. In some embodiments, the sensor device 227 may be part of the playback device 220, the display device 225, and/or may be a physically separated device communicating with one or more of the playback device 220 and the display device 225. In some embodiments, one or more of the display device 225 and the sensor device 227 may be integrated with the playback device 220. In some embodiments, the display device 225 may further comprise a processor and/or a memory for at least partially storing the retrieved content and/or the viewer's eye or head movement detected by the sensor device 227.

In some embodiments, the playback device 220 may further include a communication device such as a network adapter, a Wi-Fi transceiver, a mobile data network transceiver, etc. for communicating with the server 210 and/or a capture device. In some embodiments, the playback device 220 may further include one or more user input/output devices such as a motion tracker, buttons, a controller, a keyboard, a display screen, a touch screen and the like for the user to control the selection and playback of content items. In some embodiments, the input devices may further be used by the viewer to navigate in an immersive reality content.

Figure 3:
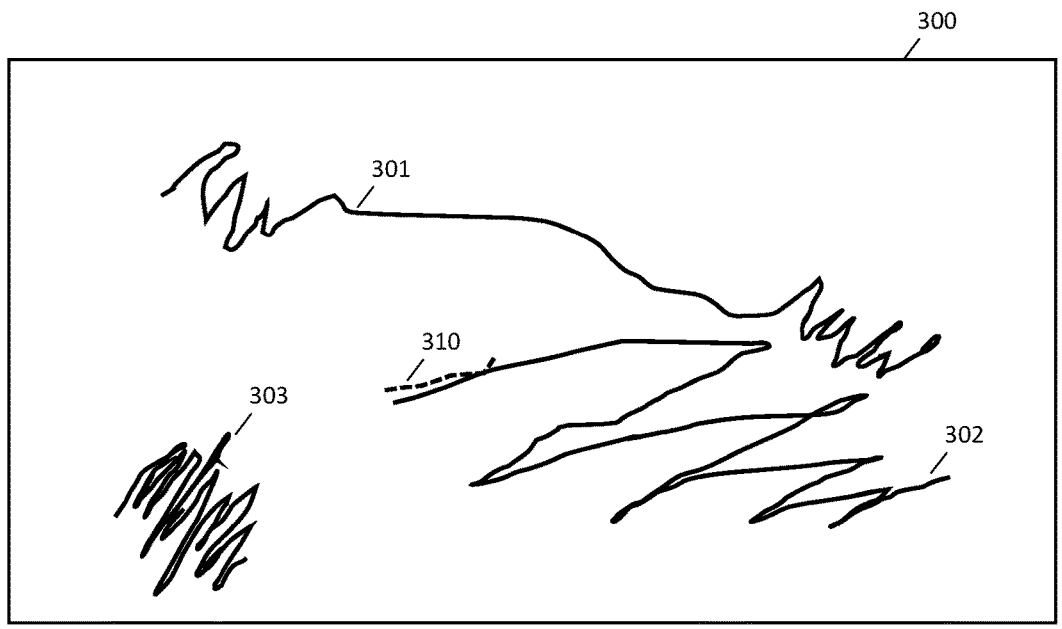
FIG. 3 is an illustration of gaze paths in accordance with some embodiments of the present invention.

Referring next to FIG. 3, there is shown an illustration of gaze paths in accordance with some embodiments of the present invention. In FIG. 3, the content area 300 represents the display area of a content and gaze paths 301, 303, and 302 represent gaze paths covering the same time period of the content playback and associated with different viewer profiles. In FIG. 3, if a viewer's tracked gaze path corresponds to the gaze path 310, the system may match the viewer to the viewer profile associated with the gaze path 302. The viewer's future gaze locations may then be predicted based on continuing to follow the gaze path 302 with time. In some embodiments, the viewer may be associated with the gaze path 302 until a substantial deviation from the gaze path 302 is detected.

The gaze paths shown in FIG. 3 are provided for illustration only and may not necessarily represent actual gaze paths. While two-dimensional gaze paths are shown, in some embodiments, the gaze paths associated with viewer profiles may comprise gaze paths in the three-dimension space. For example, the content may comprise immersive content in which viewers may navigation through a three-dimension space. In some embodiments, the gaze locations comprising the gaze path may then each include x, y, and z coordinates from a point of reference in the virtual space and a viewing direction. While the gaze paths in FIG. 3 are shown as thin lines, in some embodiments, a gaze path may comprise a wide band of area and/or viewing directions.

Figure 4:
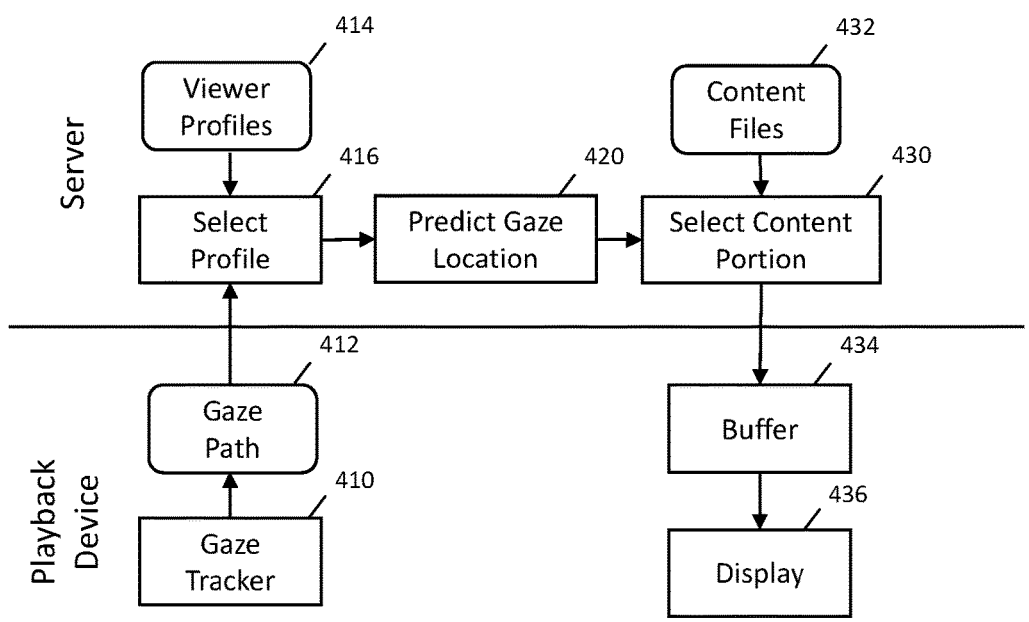
FIG. 4 is a process diagram illustrating a process for tracking gaze in accordance with some embodiments of the present invention.

Referring next to FIG. 4, there is shown a process diagram in accordance with some embodiments of the present invention. In some embodiments, the server in FIG. 4 may comprise the server 210 described with reference to FIG. 2 or a similar device. The playback device in FIG. 4 may comprise the playback device 220 described with reference to FIG. 2 or a similar device. In FIG. 4, the gaze tracker 410 of the playback device first detects the user's gaze locations and determine a gaze path 412. The gaze path 412 is then provided to the server. In some embodiments, each gaze path data point may be transmitted to the server as they are collected and the server may aggregate the data points to form a gaze path. In step 416, the server selects a viewer profile by matching the gaze path 412 with a plurality of viewer profiles 414. In step 420, the server predicts a further gaze location of the viewer based on the selected viewer profile. In step 430, the system selects a content portion to provide to the playback device based on the predicted gaze location. In some embodiments, the content portion may be retrieved and/or extracted from the content file 432. In some embodiments, the content portion may correspond to one or more video streams comprising the content. In some embodiments, the content portion may comprise a portion of a high bitrate version of the content. In step 434, the content portion is buffered at the playback device. In step 436, the content, including with the content portion, is displayed to the user.

In some embodiments, one or more of the steps 416, 420, and 430 may be performed by the playback device. For example, a plurality of viewer profiles may be preloaded on the playback device. The playback device may be configured to predict gaze locations based on the detected gaze path 412 and the plurality of locally stored viewer profiles. In some embodiments, the playback device may be configured send a request to the server that specifies the content portion based on the predicted gaze location. In some embodiments, instead of buffering retrieved content, the playback device may be configured to begin rendering the content based on the predicted gaze location using locally stored and/or streamed content files.

Referring next to FIG. 5, a method for providing content is shown. The steps in FIG. 5 may generally be performed by a processor-based device such as a one or more of a head mounted display ("HMD"), an augmented reality device, a virtual reality device, a wearable device, a portable user device, a smartphone, a personal computer, a server device, a television, a tablet computer, a game console, etc. In some embodiments, the steps in FIG. 5 may be performed by one or more of the server 210 and the playback device 220 described with reference to FIG. 2, the server described with reference to FIG. 4, and/or other similar devices.

In step 510, the system predicts a viewing direction of a user viewing a content item. In some embodiments, the viewing direction of the user may comprise one or more of a head direction and an eye direction. In some embodiments, the viewing direction may comprise a predicted direction based the future gaze location predicted in the method described with reference to FIG. 1 or a similar method. In some embodiments, a viewer gaze path comprising a history of the viewer's viewing directions may be compared to a plurality of gaze paths in viewer profiles. If the viewer's gaze path matches a gaze path in a viewer profile, future viewing directions of the viewer may be predicted based on the matching gaze path.

The content item may comprise a plurality of video streams captured by one or more of a panoramic camera system, a surround view camera system, a 360-degree camera system, an omnidirectional camera system, and the like. In some embodiments, the content item may comprise a segmented content corresponding one or more of a panorama video, an immersive video, and/or an omnidirectional video. In some embodiments, each of the plurality of video streams may be captured by a separate image sensor of a camera assembly. In some embodiments, the content item may comprise pre-recorded or real-time streaming content. The content item may comprise a plurality of individually encoded video streams hosted on a server accessible to a playback device.

In some embodiments, after step 510, the system may determine whether one or more video streams of the content item falls within the predicted view area of the user viewing the content item. In some embodiments, the user's predicted view area may correspond to an area around a fixation point corresponding to the viewing direction predicted based on the selected viewer profile. In some embodiments, the viewing direction may be based on a user's input via one or more input devices. For example, a user may use a joystick, a touchpad, a mouse, direction key, and the like to change the viewing direction. The view area may then correspond to the display area associated with the viewing direction. In some embodiments, if only one video stream falls within the view area, the system may only retrieve and/or decode the select video stream to display to the user. In some embodiments, the system may perform steps 520-540 only if two or more video streams fall within the view area of the user.

In step 520, the system selects two or more video streams of the content item. The selection of the video streams may be based on the viewing direction of the user predicted in step 510 and directional data associated with the plurality of video streams of the content item. The directional data of the plurality of video streams may be recorded by the capture system that records the content item and included as part of the content item file. In some embodiments, the capture system may include one or more IMUs for recording the orientation of the captured system during the recording of the content item. The IMU data associated with the current section of the content item may be compared with the predicted viewing direction of the user to determine the video streams that corresponds to the predicted viewing direction of the user.

In some embodiments, selecting the two or more video streams comprises loading the selected video streams to a buffer or cache to decode. In some embodiments, selecting the two or more video streams comprises retrieving the selected streams from a server that hosts the content item. In some embodiments, steps 510 and 520 may be performed by the content server, the playback device, and/or a third device.

In step 530, the system decodes the two more video streams selected in step 520 to form two or more decoded video streams. In some embodiments, the decoding may be performed by an image or video decoder hardware and/or software module on the playback device.

In step 540, the system stitches the two or more decoded video streams to form a combined image. In some embodiments, the video streams may be stitched according to known stitching methods such as methods comprising one or more of aligning, warping, and blending of the video streams. In some embodiments, the aligning of the images may be performed at the playback device via feature and/or keypoint detection.

In some embodiments, the system may further be configured to selectively stitch portions of the video streams based on the predicted view area of the user. For example, if only a portion of the overlapping area of the two video streams falls within the predicted view area of the user, the system may only blend the portion of the overlaying area that is estimated to be visible to the user based on the prediction.

In some embodiments, the degree of blending may further depend on the area's position in the field of view. For example, a rough (e.g. less computationally demanding) blending may be performed if the overlapping area falls in the peripheral area of the user's field of view and a more extensive blending may be performed if the overlapping area falls near the expected fixation point of the user. In some embodiments, the stitching of the two or more decoded video streams further comprises combining images based on warp and distortions associated with a playback device.

In step 550, the system causes the combined image generated in step 540 to be displayed to the user. In some embodiments, the image may be displayed on a flat screen display device or a head mounted display. In some embodiments, prior to step 550, the system further adjusts the combined image based on the parameters associated with the display device. In some embodiments, the system may generate stereoscope images for a 3D and/or virtual reality display device. In some embodiments, the system may adjust the resolution of the combined image based on the display resolution of the display device. In some embodiments, the system may adjust the images based on warp and distortion associated with the display device.

In some embodiments, steps 510-550 may be continuously repeated as the user changes his/her viewing direction while viewing the content item. In some embodiments, the viewer profiles selected to predict user's viewing direction in step 510 may change any number of times during a viewing of the content item. In some embodiments, depending on the viewing direction predicted in step 510, the video streams selected, decoded, and stitched in steps 520-540 may change over time.

Referring next to FIG. 6, a method for providing content is shown. The steps in FIG. 6 may generally be performed by a processor-based device such as one or more of a computer system, a server, a cloud-based server, a content host, a streaming service host, a media server, and the like. In some embodiments, the steps in FIG. 6 may be performed by one or more of the server 210 and the playback device 220 described with reference to FIG. 2, the server described with reference to FIG. 4, and/or other similar devices.

In step 610, the system predicts a future gaze location a viewer of a content item. In some embodiments, the gaze location of the user may comprise one or more of a head direction and an eye direction. In some embodiments, the future gaze location may be predicted based the method described with reference to FIG. 1 or similar methods. In some embodiments, a gaze path comprising a history of the viewer's gaze locations may be compared to a plurality of gaze paths in viewer profiles. If the viewer's gaze path matches a viewer profile gaze a path, future gaze locations the viewer may be predicted based on the matching gaze path. In some embodiments, steps 610 may be performed by the content server, the playback device, and/or a third device.

In step 620, the playback device retrieves a low bit rate version of a content item. In some embodiments, a playback device sends a content request to a server hosting the content item in step 620 to retrieve the content item. The low bit rate version of the content item may comprise a reduced bit rate version of the content item generated by a content provider and/or the hosting service. In some embodiments, step 620 may occur prior to step 610 and the low bit rate version of the content item may begin to be downloaded, buffered, and/or viewed prior to the focal area of the viewer being determined or predicted.

In step 630, the playback device retrieves a portion of a high bit rate version of the content item. In some embodiments, the playback device sends a content request identifying the focal area of the viewer predicted in step 610 to a server to retrieve the portion of the high bit rate version of the content item. In some embodiments, the server may be configured to predict a focal area and send the corresponding portion of the high bit rate version of the content item to the playback device. Generally, the retrieved portion may comprise a spatial portion of the content selected based on the predicted focal area of the viewer. In some embodiments, the retrieved portion may comprise a short temporal segment of an area of the content item (e.g. milliseconds, seconds, frames, etc.). In some embodiments, the portion of the high bit rate version of the content item may be retrieved in a video stream separately encoded from the low bit rate version of the content item retrieved in step 620. In some embodiments, the low bit rate version of the content item may buffer ahead of the retrieval of the high bit rate version of the content item.

In step 640, the system combines the portion of the high bit rate version of the content item with the low bit rate version of the content item to generate a combined image. In some embodiments, in step 640, the system first decodes the portion of the high bit rate version of the content item retrieved in step 630 and the low bit rate version of the content item retrieved in step 620. In some embodiments, if the resolution and/or framerate of the low and high bit rate versions of the content item are different, the system may first adjust the resolution and/or framerate of at least one of the versions prior to combining the images.

In step 650, the combined image is displayed on a display device. In some embodiments, the display device may comprise one or more of a monitor, a television set, a projector, a head mounted display (HMD), a virtual reality display device, a wearable device, a display screen, a mobile device, and the like. In some embodiments, prior to step 650, the system may further adjust the combined image based on the display device's specifications. For example, for virtual reality display devices, the system may adjust for the warp and distortions associated with the device.

In some embodiments, steps 610 to 650 may be repeated continuously as a viewer views a content item. In some embodiments, the viewer profiles selected to predict user's focal area in step 610 may change any number of times during a viewing of the content item. In some embodiments, based on the focal area predicted in step 610, different portions of the high bit rate version of the content item may be retrieved in step 630 and combined with the low bit rate version in step 640 over time. In some embodiments, step 620 may occur independently of steps 610 and 630.

In some embodiments, the system may further be configured to predict a view area of the viewer and retrieve only a portion of the low bit rate content based on a view area of the viewer in step 620. The view area of the viewer may be predicted based on matching the viewer to a viewer profile similar to the prediction of the focal area in step 610. The view area of the viewer may generally refer to the area of the content that is visible to the user but may or may not be in focus in the viewer's field of vision.

In some embodiments, one or more of the embodiments, methods, approaches, and/or techniques described above may be implemented in one or more computer programs or software applications executable by a processor based apparatus or system. By way of example, such processor based apparatus or systems may comprise a computer, entertainment system, game console, workstation, graphics workstation, server, client, portable device, pad-like device, etc. Such computer program(s) may be used for executing various steps and/or features of the above-described methods and/or techniques. That is, the computer program(s) may be adapted to cause or configure a processor based apparatus or system to execute and achieve the functions described above. For example, such computer program(s) may be used for implementing any embodiment of the above-described methods, steps, techniques, or features. As another example, such computer program(s) may be used for implementing any type of tool or similar utility that uses any one or more of the above described embodiments, methods, approaches, and/or techniques. In some embodiments, program code macros, modules, loops, subroutines, calls, etc., within or without the computer program(s) may be used for executing various steps and/or features of the above-described methods and/or techniques. In some embodiments, the computer program(s) may be stored or embodied on a computer readable storage or recording medium or media, such as any of the computer readable storage or recording medium or media described herein.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein. For example, in some embodiments the present invention provides one or more non-transitory computer readable storage mediums storing one or more computer programs adapted or configured to cause a processor based apparatus or system to execute steps comprising: presenting a content to a viewer via a playback device, tracking a gaze path of the viewer with a gaze tracker coupled to the playback device, selecting a viewer profile from a plurality of viewer profiles stored in a viewer profile database based on the gaze path of the viewer, and predicting a future gaze location of the viewer based on the viewer profile.

While the invention herein disclosed has been described by means of specific embodiments and applications thereof, numerous modifications and variations could be made thereto by those skilled in the art without departing from the scope of the invention set forth in the claims.

What is claimed is:

1. A method for gaze tracking, comprising:
presenting video content to a viewer via a playback device;
tracking a gaze path of the viewer while the viewer watches the video content as it is being played;
selecting a viewer profile from a plurality of viewer profiles stored in a viewer profile database based on the gaze path of the viewer; and
predicting a future gaze location of the viewer based on the viewer profile, wherein the predicted future gaze location of the viewer comprises one or more fixation points in one or more frames of the video content.

2. The method of claim 1, wherein the viewer profile comprises an expected gaze path associated with the video content.

3. The method of claim 1, wherein the plurality of viewer profiles comprises one or more viewer profiles generated based on gaze paths of a plurality of users who viewed the video content.

4. The method of claim 1, wherein the plurality of viewer profiles comprises one or more default viewer profile created during a post-production process of the video content.

5. The method of claim 1, wherein the plurality of viewer profiles comprises one or more viewer profiles generated based on tracking a movement of one or more objects in the video content.

6. The method of claim 1, further comprising:
selecting a portion of the video content based on the future gaze location; and
buffering the portion of the video content at the playback device.

7. The method of claim 6, wherein the portion of the video content corresponds to a focal area associated with the future gaze location.

8. The method of claim 6, wherein the portion of the video content corresponds to a video stream selected from a plurality of video streams comprising the video content.

9. The method of claim 1, further comprising:
determining an insertion location for added content based on the future gaze location.

10. The method of claim 1, further comprising:
tracking a subsequent gaze path of the viewer after selecting the viewer profile; and
selecting a different one of the plurality of viewer profiles based on the subsequent gaze path.

11. A system for gaze tracking, comprising:
a viewer profile database;
a communication device; and
a processor coupled to the viewer profile database and the communication device, the processor being configured to:
present video content to a viewer via a playback device coupled to the communication device;
track a gaze path of the viewer while the viewer watches the video content as it is being played;
select a viewer profile from a plurality of viewer profiles stored in the viewer profile database based on the gaze path of the viewer; and predict a future gaze location of the viewer based on the viewer profile, wherein the predicted future gaze location of the viewer comprises one or more fixation points in one or more frames of the video content.

12. The system of claim 11, wherein the viewer profile comprises an expected gaze path associated with the video content.

13. The system of claim 11, wherein the plurality of viewer profiles comprises one or more viewer profiles generated based on gaze paths of a plurality of users who viewed the video content.

14. The system of claim 11, wherein the plurality of viewer profiles comprises one or more default viewer profile created during a post-production process of the video content.

15. The system of claim 11, wherein the plurality of viewer profiles comprises one or more viewer profiles generated based on tracking a movement of one or more objects in the video content.

16. The system of claim 11, wherein the processor is further configured to:
select a portion of the video content based on the future gaze location; and
buffer the portion of the video content at the playback device.

17. The system of claim 16, wherein the portion of the video content corresponds to a focal area associated with the future gaze location.

18. The system of claim 16, wherein the portion of the video content corresponds to a video stream selected from a plurality of video streams comprising the video content.

19. The system of claim 11, wherein the processor is further configured to:
determine an insertion location for added content based on the future gaze location.

20. The system of claim 11, wherein the processor is further configured to:
track a subsequent gaze path of the viewer after selecting the viewer profile; and
select a different one of the plurality of viewer profiles based on the subsequent gaze path.

21. A non-transitory computer readable storage medium storing one or more computer programs configured to cause a processor based system to execute steps comprising:
presenting video content to a viewer via a playback device;
tracking a gaze path of the viewer while the viewer watches the video content as it is being played;
selecting a viewer profile from a plurality of viewer profiles stored in a viewer profile database based on the gaze path of the viewer; and
predicting a future gaze location of the viewer based on the viewer profile, wherein the predicted future gaze location of the viewer comprises one or more fixation points in one or more frames of the video content.

22. A system for gaze tracking, comprising:
a display device;
a gaze tracker;
a communication device; and
a processor coupled to the display device, the gaze tracker, and the communication device, the processor being configured to:
present video content to a viewer via the display device;
track a gaze path of the viewer with the gaze tracker while the viewer watches the video content as it is being played;
select a viewer profile from a plurality of viewer profiles stored in a viewer profile database based on the gaze path of the viewer;
predict a future gaze location of the viewer based on the viewer profile, wherein the predicted future gaze location of the viewer comprises one or more fixation points in one or more frames of the video content; and
retrieve, with the communication device, a portion of the video content from a content server based on the future gaze location.

23. The system of claim 22, wherein the plurality of viewer profiles comprises one or more viewer profiles generated based on gaze paths of a plurality of users who viewed the video content.

24. The system of claim 22, wherein the plurality of viewer profiles comprises one or more default viewer profile created during a post-production process of the video content.

25. The system of claim 22, wherein the plurality of viewer profiles comprises one or more viewer profiles generated based on tracking a movement of one or more objects in the video content.

26. The system of claim 22, wherein the processor is further configured to:
buffer a portion of the video content that is selected based on the future gaze location.

27. The system of claim 22, wherein the processor is further configured to:
track a subsequent gaze path of the viewer after selecting the viewer profile; and
select a different one of the plurality of viewer profiles based on the subsequent gaze path.

* * * * *